United States Patent
Evans et al.

(10) Patent No.: US 6,851,056 B2
(45) Date of Patent: Feb. 1, 2005

(54) CONTROL FUNCTION EMPLOYING A REQUESTING MASTER ID AND A DATA ADDRESS TO QUALIFY DATA ACCESS WITHIN AN INTEGRATED SYSTEM

(75) Inventors: Edward K. Evans, Essex Junction, VT (US); Eric M. Foster, Owego, NY (US); Dennis E. Franklin, Endicott, NY (US); William E. Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 10/125,527

(22) Filed: Apr. 18, 2002

(65) Prior Publication Data
US 2003/0200451 A1 Oct. 23, 2003

(51) Int. Cl.[7] .................. G06F 13/00; G06F 12/14; H04L 9/00

(52) U.S. Cl. ............... 713/193; 713/1; 713/182; 713/193; 713/200; 710/107; 710/110; 710/200; 710/244

(58) Field of Search ............... 713/193, 201, 713/200, 182, 1; 710/200, 243, 244, 107, 110

(56) References Cited

U.S. PATENT DOCUMENTS

| | | | |
|---|---|---|---|
| 4,168,396 A | 9/1979 | Best | 178/22 |
| 4,465,901 A | 8/1984 | Best | 178/22.08 |
| 4,797,853 A | 1/1989 | Savage et al. | 364/900 |
| 4,920,483 A | 4/1990 | Pogue et al. | 364/200 |
| 5,144,659 A | 9/1992 | Jones | 380/4 |
| 5,367,695 A | * 11/1994 | Narad et al. | 709/210 |
| 5,421,006 A | 5/1995 | Jablon et al. | 395/575 |
| 5,440,713 A | 8/1995 | Lin et al. | 395/485 |
| 5,464,087 A | 11/1995 | Bounds et al. | 194/200 |
| 5,491,827 A | 2/1996 | Holtey | 395/800 |
| 5,561,817 A | 10/1996 | McCormack et al. | 395/842 |
| 5,602,536 A | 2/1997 | Henderson et al. | 340/825.31 |
| 5,647,017 A | 7/1997 | Smithies et al. | 382/119 |
| 5,703,952 A | 12/1997 | Taylor | 380/44 |

(List continued on next page.)

OTHER PUBLICATIONS

Foster et al., pending U.S. patent application entitled "Control Function With Multiple Security States For Facilitating Secure Operation Of An Integrated System", Ser. No. 10/125,115, co-filed herewith.

Foster et al., pending U.S. patent application entitled "Control Function Implementing Selective Transparent Data Authentication Within An Integrated System", Ser. No. 10/125,708, co-filed herewith.

Foster et al., pending U.S. patent application entitled "Initializing, Maintaining, Updating And Recovering Secure Operation Within An Integrated System Employing A Data Access Control Function", Ser. No. 10/125,803, co-filed herewith.

(List continued on next page.)

Primary Examiner—Gilberto Barron
Assistant Examiner—A. Nobahar
(74) Attorney, Agent, or Firm—H. Daniel Schnurmann; William H. Steinberg, Esq.; Heslin Rothenberg Farley & Mesiti P.C.

(57) ABSTRACT

An access control function for an integrated system is provided which determines data access based on the master id of a requesting master within the system and the address of the data. The access control function can be inserted, for example, into the data transfer path between bus control logic and one or more slaves. In addition to determining whether to grant access to the data, the access control function can further qualify the access by selectively implementing encryption and decryption of data, again dependent on the data authorization level for the particular functional master initiating the request for data.

19 Claims, 10 Drawing Sheets

U.S. PATENT DOCUMENTS

| | | | |
|---|---|---|---|
| 5,757,919 A | 5/1998 | Herbert et al. | 380/25 |
| 5,778,316 A | 7/1998 | Persson et al. | 455/434 |
| 5,809,230 A | 9/1998 | Pereira | 395/186 |
| 5,825,878 A | 10/1998 | Takahashi et al. | 380/4 |
| 5,841,868 A | 11/1998 | Helbig, Sr. | 380/25 |
| 5,887,131 A * | 3/1999 | Angelo | 713/202 |
| 5,893,921 A | 4/1999 | Bucher et al. | 711/146 |
| 5,912,453 A | 6/1999 | Gungl et al. | 235/492 |
| 5,918,007 A | 6/1999 | Blackledge, Jr. et al. | 395/186 |
| 5,933,616 A * | 8/1999 | Pecone et al. | 710/240 |
| 5,935,247 A | 8/1999 | Pai et al. | 713/200 |
| 5,940,513 A | 8/1999 | Aucsmith et al. | 380/25 |
| 5,943,483 A * | 8/1999 | Solomon | 710/107 |
| 6,021,476 A | 2/2000 | Segars | 711/163 |
| 6,023,510 A | 2/2000 | Epstein | 380/25 |
| 6,052,763 A * | 4/2000 | Maruyama | 711/152 |
| 6,182,142 B1 | 1/2001 | Win et al. | 709/229 |
| 6,182,217 B1 | 1/2001 | Sedlak | 713/172 |
| 6,226,742 B1 | 5/2001 | Jakubowski et al. | 713/170 |
| 6,230,269 B1 | 5/2001 | Spies et al. | 713/182 |
| 6,311,255 B1 | 10/2001 | Sadana | 711/152 |
| 6,490,642 B1 * | 12/2002 | Thekkath et al. | 710/110 |
| 6,671,761 B2 * | 12/2003 | Kim | 710/244 |
| 2001/0044886 A1 * | 11/2001 | Cassagnol et al. | 711/163 |
| 2003/0172214 A1 * | 9/2003 | Moyer et al. | 710/200 |

OTHER PUBLICATIONS

S. Weingart, "Physical Security Devices for Computer Subsystems: A Survey of Attacks and Defenses", Proceedings of Cryptographic Hardware and Embedded Systems—CHES 2000, Second International Workshop, Worcester, MA, USA, Aug. 17–18, 2000, pp. 1–14.

C. Jutla, "Encryption Modes with Almost Free Message Integrity", Proc. Eurocrypt 2001, pp. 529–544, LNCS 2045.

D. Lie, et al., "Architectural Support for Copy and Tamper Resistant Software", ASPLOS–IX 2000, ACM 0–89791–88–6/97/05, Cambridge, Massachusetts USA.

* cited by examiner

CONTROL FUNCTION EMPLOYING A REQUESTING MASTER ID AND A DATA ADDRESS TO QUALIFY DATA ACCESS WITHIN AN INTEGRATED SYSTEM

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"CONTROL FUNCTION WITH MULTIPLE SECURITY STATES FOR FACILITATING SECURE OPERATION OF AN INTEGRATED SYSTEM", by Foster et al., U.S. Ser. No. 10/125,115, co-filed herewith;

"CONTROL FUNCTION IMPLEMENTING SELECTIVE TRANSPARENT DATA AUTHENTICATION WITHIN AN INTEGRATED SYSTEM", by Foster et al., U.S. Ser. No. 10/125,708, co-filed herewith; and "INITIALIZING, MAINTAINING, UPDATING AND RECOVERING SECURE OPERATION WITHIN AN INTEGRATED SYSTEM EMPLOYING A DATA ACCESS CONTROL FUNCTION", by Foster et al., U.S. Ser. No. 10/125,803, co-filed herewith.

TECHNICAL FIELD

This invention relates generally to data request handling and transfer of data within an integrated system, and more particularly, to an access control function for an integrated system which grants, denies or otherwise qualifies data access based on a master id of a requesting master within the integrated system and an address of the data.

BACKGROUND OF THE INVENTION

Multiple functions are today being commonly integrated onto a single system chip. When initially defining an architecture for integration of multiple discrete components onto a single chip, access to external devices including memory can be an issue. For example, an MPEG video decoder system often employs external memory for various data areas, or buffers such as frame buffers. This external memory is conventionally implemented using either DRAM or SDRAM technology.

Two approaches are typical in the art for accessing off-chip devices. In a first approach, each on-chip functional unit is given access to the needed external device(s) through a data bus dedicated to that particular unit. Although locally efficient for accessing the external device, globally within the integrated system this approach is less than optimal. For example, although each function will have complete access to its own external memory area, there is no shared access between functions of the integrated system. Thus, transferring data from one memory area to another memory area of the system is often needed. This obviously increases the number of data transfers and can degrade performance of the overall system, i.e., compared with a shared memory system.

Another approach is to employ a single common bus within the integrated system which allows one or more functional units of the system to communicate to external devices through a single port. Although allowing the sharing of resources, such as memory, one difficulty with this approach concerns controlling access to content or other sensitive data in the integrated system. For example, when using a large common memory pool in an integrated design, it becomes difficult to prevent unauthorized access to protected memory spaces, such as compressed data supplied by a transport demultiplexer to a decoder of a set-top box. This is especially true for a system where the programming interface is open and outside development is encouraged. Each of the functional masters should be able to access the memory space and it is not possible to differentiate whether an access is from a trusted master or an outside request, e.g., coming through an untrusted or open master.

In view of the above, a need exists in the art for an enhanced access control approach for an integrated system. More particularly, a need exists for an access control function which resides between functional masters and slave devices, and which allows an access to be further qualified (for example, to inject data encryption and data decryption), or in certain cases prevented.

SUMMARY OF THE INVENTION

The shortcomings of the prior art are overcome and additional advantages are provided through the provision of a data access method for an integrated system having multiple functional masters, the multiple functional masters having multiple master ids. The method includes: receiving a request for data from a requesting master of the multiple functional masters; and in response to the request, determining whether to grant, deny or qualify access to the data based on a master id of the requesting master and an address of the data.

In enhanced aspects, the method includes providing different levels of data access for the multiple functional masters, as well as determining whether the request comprises a read request or a write request. If the request is a read request, then the method can include determining whether to deny access to the data, pass the data clear, or decrypt the data. If the request is a write request, the method can include determining whether to deny forwarding of the data, to pass the data clear, or to encrypt the data. In one embodiment, the request is a granted master request received from the bus control logic of the integrated system, with the method being implemented in the data flow between the bus control logic and at least one slave of the integrated system. More particularly, the method could be implemented within a bus-to-bus bridge of the integrated system, or within a secure memory subsystem of the integrated system, etc.

Systems and computer program products corresponding to the above-summarized methods are also described and claimed herein.

Advantageously, provided herein is an access control function for qualifying data access within an integrated system. The control function can reside in the data flow between functional masters and slave devices of the integrated system, particularly when a system employs a common bus structure between the functional masters and slave devices. The control function allows access to be granted, denied or further qualified based, for example, on the master id of the requesting master and the address of the requested data. This control approach provides the capability to selectively allow different functions access to data (for example, to different memory regions), as a way of segregating memory into open and secure spaces based on function. In addition, the control function provides a technique for encrypting data blocks as the data is sent to memory. This prevents circumventing system security by simply relocating blocks of data to other memory locations or other devices.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
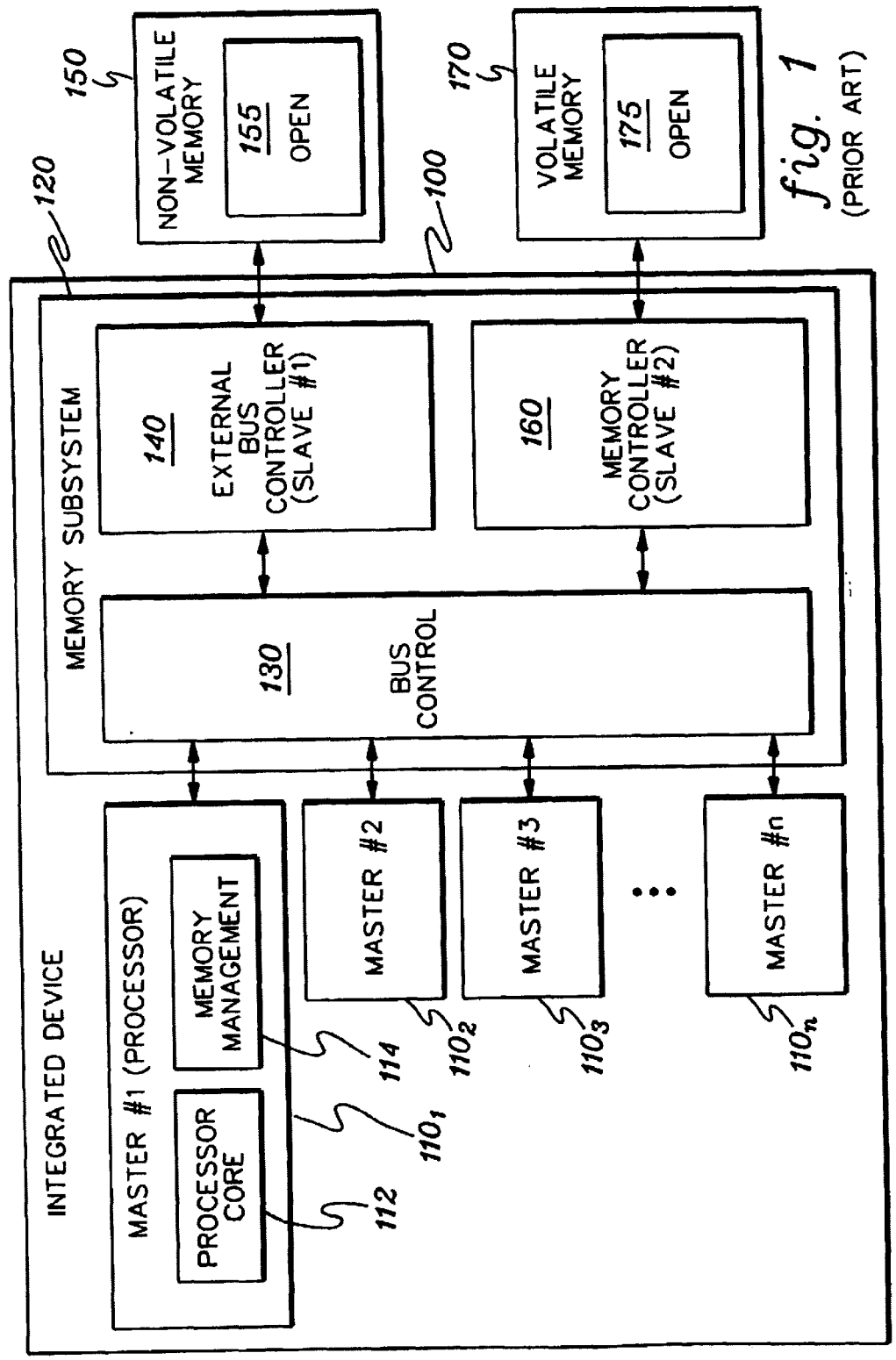
FIG. 1 depicts one example of a typical integrated device employing common memory access through a memory subsystem.

FIG. 1 depicts a conventional integrated device, generally denoted 100, having multiple internal functional masters $110_1$, $110_2$, $110_3$ ... $110_n$. Master $110_1$ is shown as a processor, having a processor core 112 and a memory management unit 114. Internal masters $110_1$, $110_2$, $110_3$ ... $110_n$ connect in this example to a memory subsystem 120, which includes bus control logic 130 of a shared bus. Those skilled in the art will understand that although shown within the memory subsystem, bus control 130 could alternatively reside outside of subsystem 120.

Bus control unit 130 coordinates and consolidates requests to slaves in the integrated device. For example, a first slave might comprise an external bus controller 140 which is connected to an external non-volatile memory 150, such as flash memory, having an open memory portion 155. A second slave, memory controller 160 connects to external volatile memory 170, such as SDRAM or DRAM. Memory 170 includes an open memory portion 175. In general, functions share a common memory pool in this integrated design in order to minimize memory costs, and to facilitate the transfer of data between functions. As such, all internal masters have equal access to both non-volatile and volatile memory, and both storage spaces are labeled open, meaning that there are no limits on data access.

Typically, non-volatile memory is used for persistent storage, wherein data should be retained even when power is removed. This memory may contain the boot code, operating code, such as the operating system and drivers, and any persistent data structures. Volatile memory is used for session oriented storage, and generally contains application data as well as data structures of other masters. Since volatile memory is faster than non-volatile memory, it is common to move operating code to volatile memory and execute instructions from there when the integrated device is operational.

Figure 2:
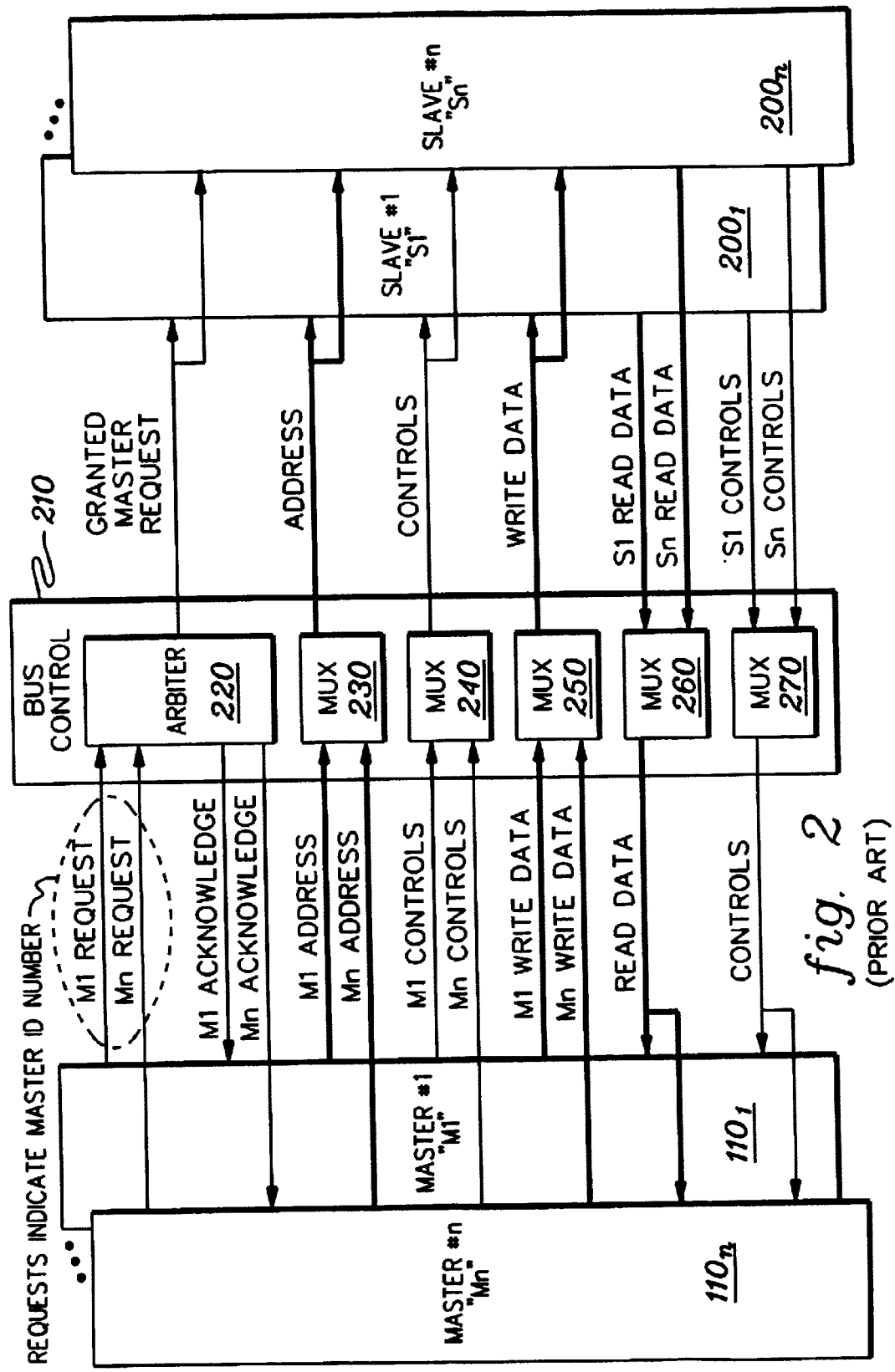
FIG. 2 depicts one example of use of master ids within an integrated system, wherein the master ids are employed by a bus control arbiter to grant or deny bus access.

FIG. 2 illustrates a bus control architecture such as would be employed by bus control unit 130 of FIG. 1. This architecture allows multiple functional masters $110_1 \ldots 110_n$ to communicate with multiple slaves $200_1 \ldots 200_n$ over a common shared bus. An example of this bus architecture is the processor local bus (PLB) of the CoreConnect architecture marketed by International Business Machines Corporation of Armonk, N.Y.

The masters within the architecture each have a unique master id which comprises part of the request signal that is sent to arbiter 220 of bus control function 210. When multiple requests are presented, arbiter 220 selects the appropriate master (based on bus priority) and sends an acknowledgment back to that master. Arbiter 220 also propagates the granted request to the slave(s), along with the additional information needed, i.e., data address information and control information. As one example, the control information might include a read/write control signal indicative of whether data is to be written from the master to the slave or read from the slave to the master. The data address signals pass through a multiplexer 230, while the control signals pass through a multiplexer 240, both of which are shown to be within bus control unit 210. Similarly, data to be written passes from the masters to the slaves through a multiplexer 250, and data read via the slaves returns to the masters through a multiplexer 260 within bus control 210. Further, a multiplexer 270 multiplexes control signals from the slaves for return to the masters. These control signals may include, for example, status and/or acknowledgment signals. Conventionally, the slave to which a granted master request is targeted based on the address, responds to the master with the appropriate information.

Figure 3:
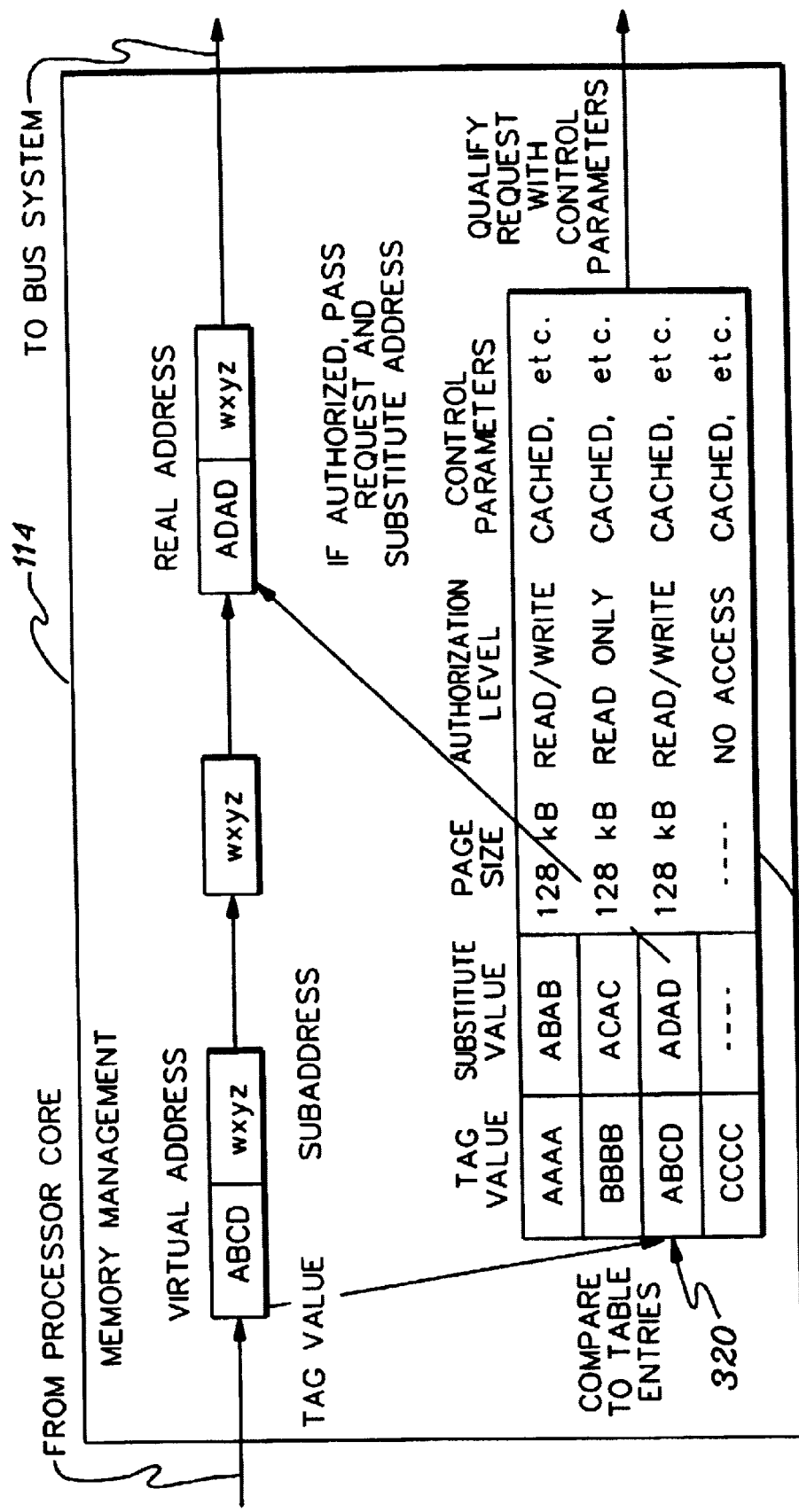
FIG. 3 depicts one example of a typical memory management unit function employed, for example, by master #1 in the integrated device example of FIG. 1.

By way of further background, FIG. 3 depicts one example of a memory management unit 114 for a processor master, such as master 110, shown in FIG. 1. Unit 114 receives virtual address requests from the processor core of the processor master. The processor can in general be running several processes as separate code threads at a given point in time, and separates external requests through the use of virtual addresses where each process can run in its own segregated memory space. However, since in practice all programs use common address space, the addresses must be remapped before the request is presented to the bus control unit. This remapping is performed by memory management unit 114.

As shown in FIG. 3, the upper address bits of a virtual address request are initially compared against the table that has been configured by the operating system. The table lists allowable upper address bit combinations, or tag values, and then a substitute address that is used to replace the upper address bits. For each entry, it will also indicate the page size, or size of the remapped region, and the type of access that is allowed for the defined process. It can also list other attributes such as whether the request may be stored in cache, etc. These parameters are sent with the request to the bus control unit as control information.

Note that in a typical system such as presented in FIGS. 1–3, there are several security risks. Namely, The behavior of the processor can be controlled by modifying the operating code or data structures, and internal data or operation can be compromised.

In certain cases, such as a communication controller, etc., an internal master can be controlled by an external source, and can be used to compromise internal code or data since memory is shared.

Debug and development tools that are used in software development can be used to modify or monitor the processor's behavior.

A given master can unintentionally corrupt or compromise the operation of another internal master since memory is shared.

The solution presented herein to the above-noted security risks involves providing an access control function disposed within the data path between the bus control and the slave devices. This access control function uses (in one embodiment) characteristics of the internal bus that connects the functional masters to the slave devices to allow each request for access to be further qualified based on a set of secure control information, and if desired, to be prevented. Advantageously, this access control function provides the ability to differentiate accesses by which master is making the data request, as well as where the data is stored, and then to either grant or limit access accordingly, or to otherwise qualify the access.

Figure 4:
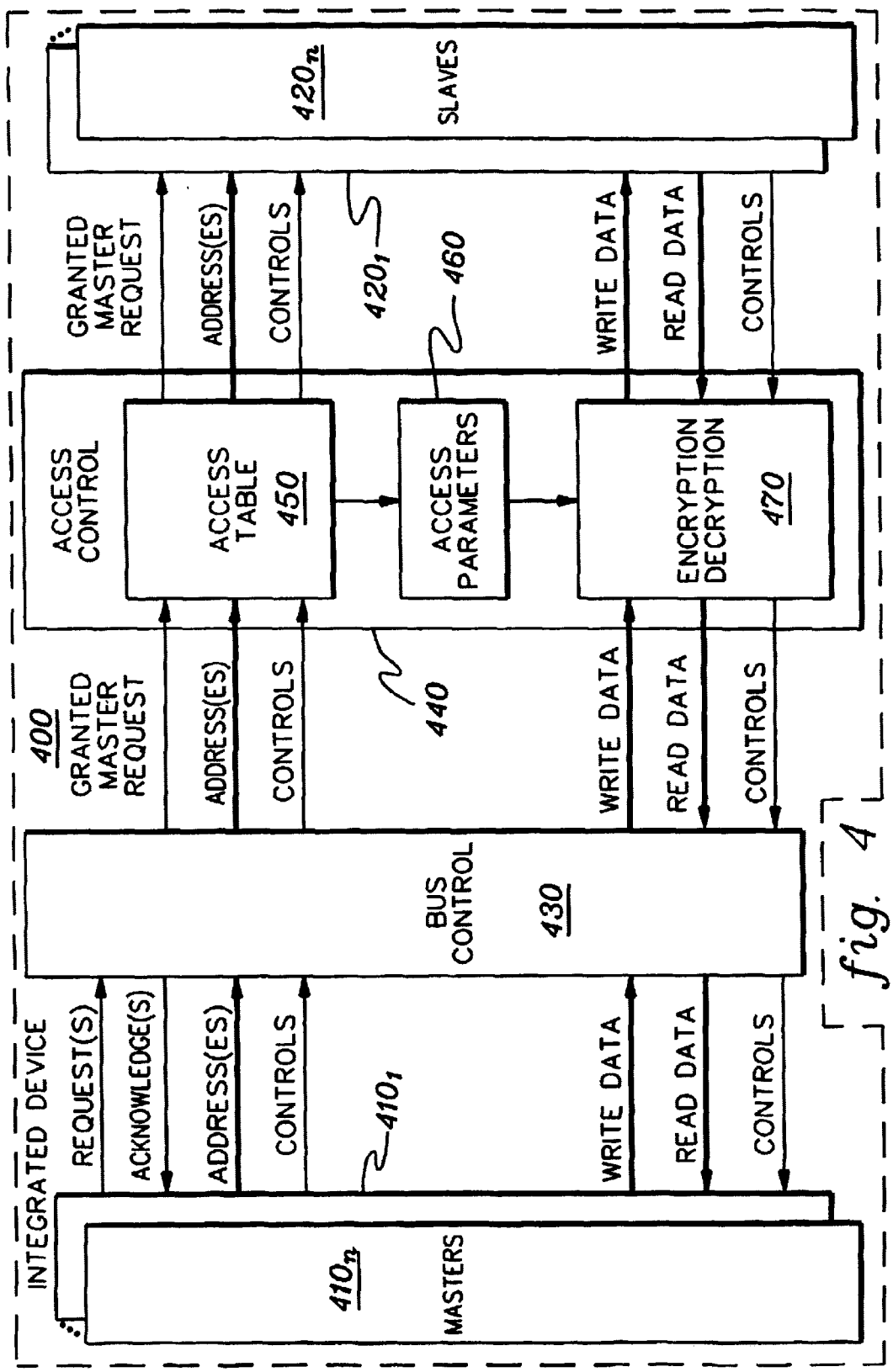
FIG. 4 depicts one example of an integrated device employing a data access control function, in accordance with an aspect of the present invention.

FIG. 4 illustrates one embodiment of a system, generally denoted 400, which includes an access control function 440 in accordance with an aspect of the present invention. System 400 again includes multiple functional masters $410_1 \ldots 410_n$ which communicate via a bus control 430 with one or more slaves $420_1 \ldots 420_n$. In this case, however, access control function 440 intercedes in the data path between bus control 430 and slaves $420_1 \ldots 420_n$. A simplified view of the signals of the bus control architecture from FIG. 2 is also shown.

A request from a master granted control by the bus control unit is sent to the access control function 440, along with the requested address and associated controls (read or write, etc.). An access table 450 is used by unit 440 to compare the requested address, master id, and read or write indicator to a definition of allowed access capability for that master. The given request can either be blocked (terminated), allowed in the clear, or allowed with encryption/decryption. If the requested transfer is allowable, then the bus signals are propagated to the slaves, and access parameters 460 associated with the request based on the access table are sent to an encryption/decryption engine 470, i.e., if encryption/decryption is applicable. The encryption/decryption engine can be used to encrypt write data as the data is transferred to a given slave, or decrypt read data as the data is returned from a given slave using the associated access parameters as described further below.

Boot code (or initialization code) fully configures the access control function, including, for example, the access table, including access levels that specify the allowed transactions based on master ID and address range, and also the access parameters to define how a request is to be processed. Prior to passing control to a next level of software, the boot code locks the access table so that the different levels of access security identified therein can not be modified subsequently (and thus, are predefined).

Figure 5:
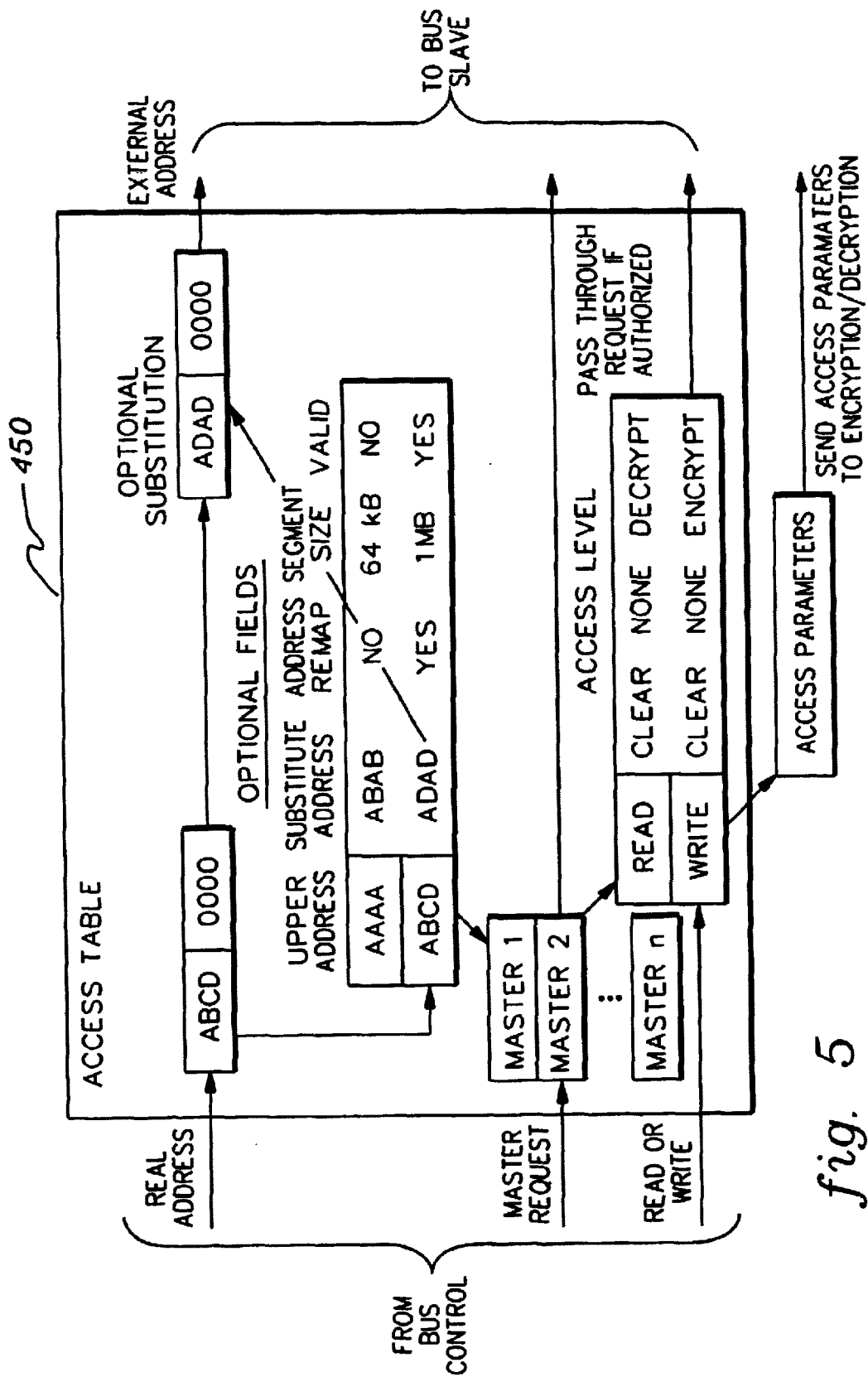
FIG. 5 depicts one example of an access table employed by the data access control function of FIG. 4, in accordance with an aspect of the present invention.

FIG. 5 depicts one detailed example of an access table 450 which can be employed by the access control function 440 of FIG. 4. Similar to the memory management unit of FIG. 2, but different in purpose, the upper address bits of a real address for a granted request from the bus control unit are compared with a list of allowable entries, or tags. For each tag, additional information or attributes are listed such as a possible substitute address, whether remapping to the substitute address is allowed, the size of the segment associated with the tag, and whether the overall entry can be considered valid. In addition, a given table entry points to another look-up table that lists read or write authority by master id number. Using this mechanism, a given request from the bus control unit is compared against the defined upper addresses, master ids, and read or write indicators to arrive at an access level for the request. Further, the request can be associated with a set of access parameters depending upon the results of the table comparisons.

Figure 6:
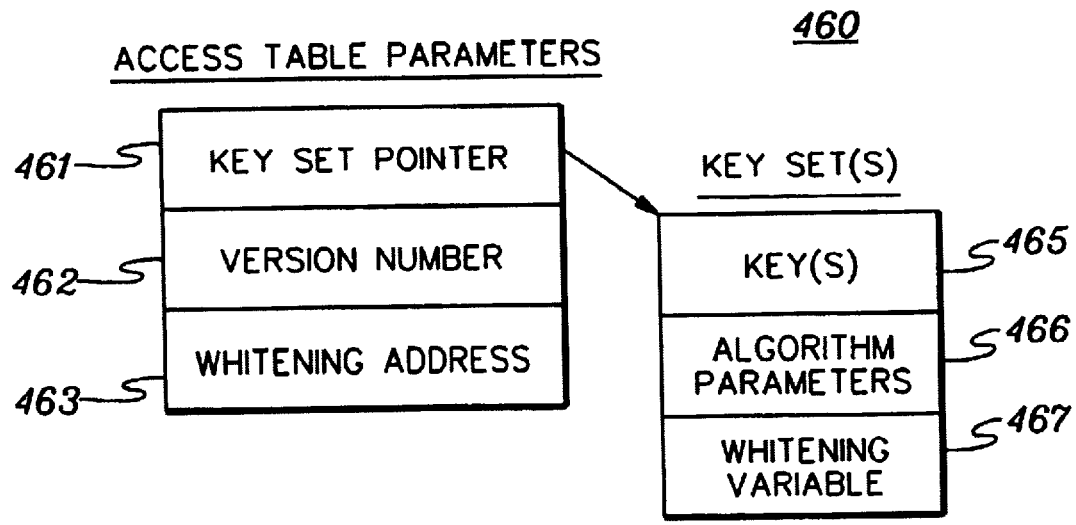
FIG. 6 depicts one example of access parameters obtained, for example, from the access table of FIG. 5 for use by the encryption/decryption sub-function of the data access control function of FIG. 4, in accordance with an aspect of the present invention.

FIG. 6 illustrates an example of these access parameters 460 that can be defined by the access control unit. For a given request, the following parameters can be passed to the encryption/decryption unit 470 (FIG. 4):

Key set pointer 461 which contains the index number of the key set to be used for any cryptographic operations. Note that the number of key sets will in general be much smaller than the number of table entries, so several entries might share a given key set.

Version number 462 which is an arbitrarily defined value that is used to differentiate a given block of encrypted code or data from a previous one using the same memory. Since the version number is used as part of the cryptographic process (as explained further below), changing to a new version number will prevent successful decryption of a region's old content that was based on a previous number. This can be used to either protect or obsolete data blocks.

Whitening address 463 which is used as a parameter in the cryptographic whitening (discussed below). This address can be different from the external address that is presented to the slave, or it can be the same. Under certain conditions, it is advantageous to be able to send a data block to a given address, but cryptographically bind it to a separate address so that when it is read back later in time, it can be relocated to the defined separate address.

As noted, the key set pointer 461 of the access parameters points to a given key set as shown in FIG. 6, this structure can be defined as:

Key(s) 465 to be used with a cryptographic process. These can be either persistent keys used across sessions, or dynamic keys that are only used for a given session.

Algorithm parameters 466 that define how the cryptographic algorithm is to operate. Examples of these parameters could be the strength of the algorithm, and even a particular algorithm selection.

Whitening variable 467 which is a secret number that is defined specifically for a given device and prevents relocating code and data to other devices, as well as complicating overall relocation within the external address space.

Figure 7:
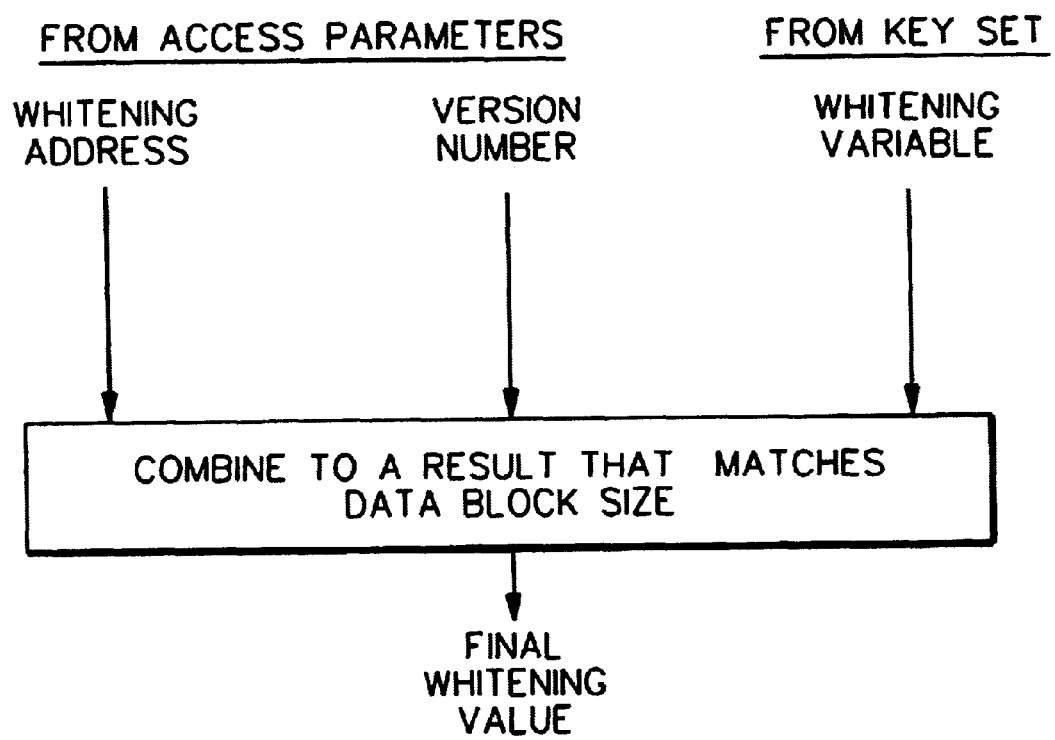
FIG. 7 depicts one example of an approach for deriving a whitening value, in accordance with an aspect of the present invention.

Whitening is a method of adding a variable to data to be encrypted as a means of removing pattern dependencies; and is described in, for example, an article by C. Jutla entitled "Encryption Modes With Almost Free Message Integrity" Proc. Eurocrypt 2001, pp. 529–544, LNCS 2045. FIG. 7 depicts one example of how the variable used for whitening in an encryption/decryption process 470 (FIG. 4) can be generated. In this example, three parameters are mathematically combined to yield a final value that is preferably the same bit length as the data block size that is being processed. These parameters are the whitening address 463 and version number 462 as defined in the access parameters (FIG. 6), and the whitening variable 467 as defined in the key set (FIG. 6). The resultant whitening value comprises an address sensitive whitening value that also provides time dependent customization through the version number.

Figure 8:
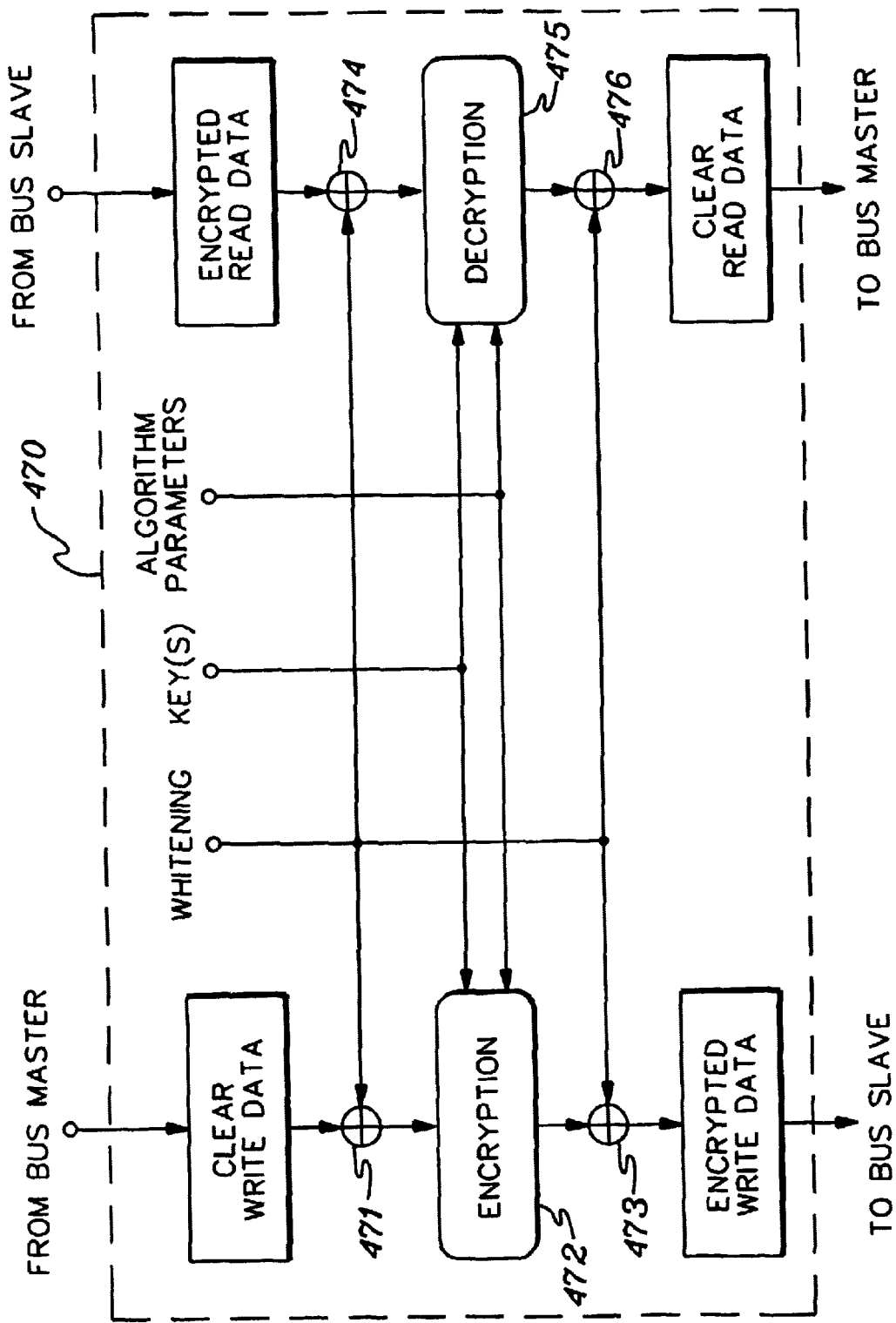
FIG. 8 depicts one example of the use of the access parameters and whitening value in selectively encrypting and decrypting transferred data, in accordance with an aspect of the present invention.

FIG. 8 depicts one example of the operation of an encryption/decryption unit 470 of an access control function, in accordance with an aspect of the present invention. As shown, three parameters are passed into the unit 470 with the access parameters. These parameters include the whitening value defined, for example, via the process of FIG. 7, the key(s) 465 (FIG. 6) and the algorithm parameters 466 (FIG. 6) from the key set. These parameters are collectively used to control the operation of the encryption or decryption functions.

For a write operation, clear write data from a bus master is shown entering the encryption/decryption unit and initially being combined with the whitening value in a first operation 471, then encrypted 472, and finally again combined with a whitening value a second time 473. The encrypted write data is then presented to the bus slave. The cryptographic process of employing the whitening value for mixing with the data can be readily implemented by one skilled in the art.

For a read operation, the read data is shown entering the encryption/decryption unit from the bus slave, and being processed in the reverse manner as the write data; that is, the write and read processing are symmetric. More particularly, the whitening value is initially employed to un-mix the encrypted read data 474 prior to decryption thereof 475, and subsequent to decryption thereof 476 such that the layers of encryption are simply reversed during the decryption process.

Figure 9:
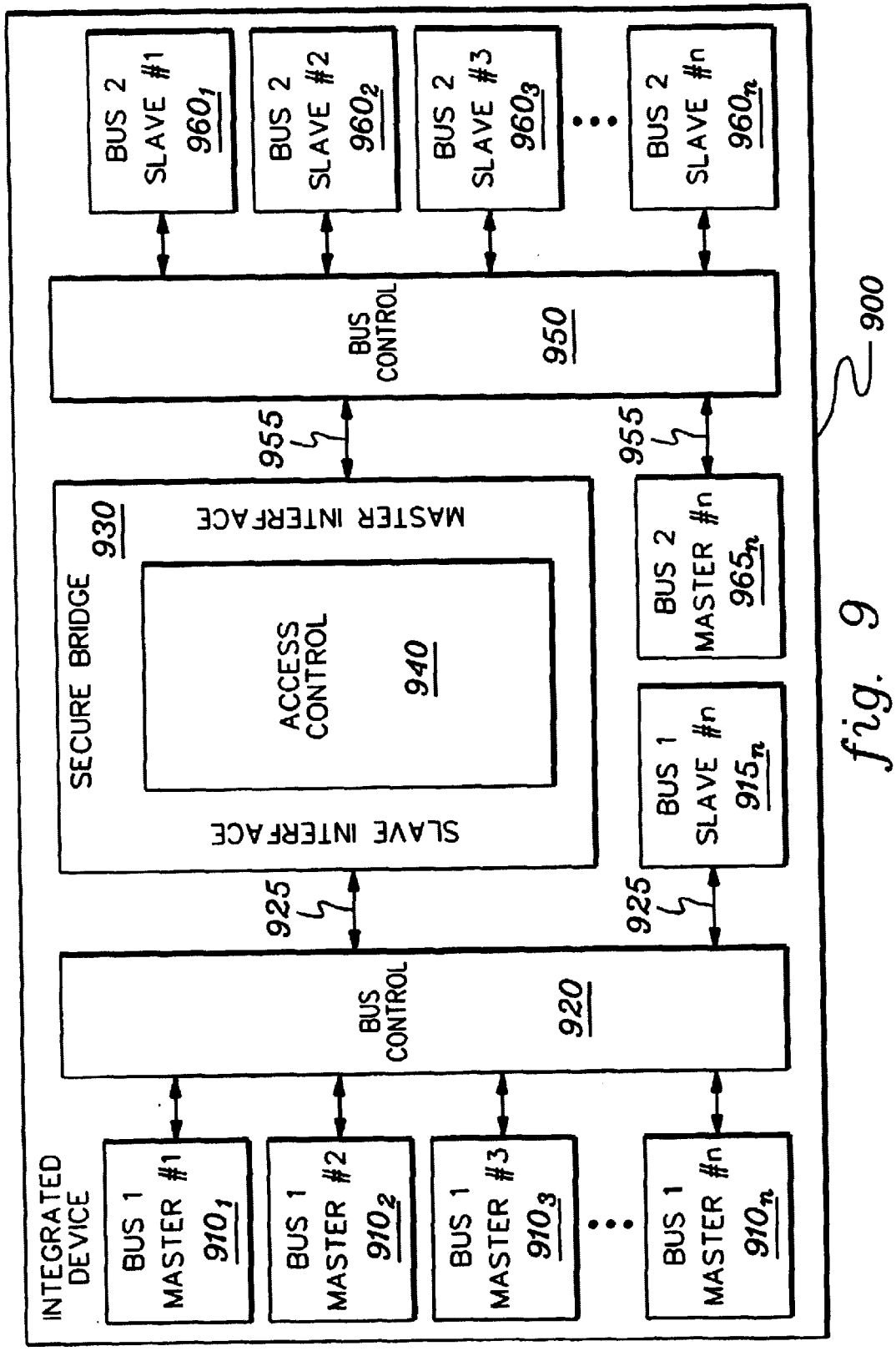
FIG. 9 depicts one embodiment of an access control function implemented within a bus-to-bus bridge of an integrated device, in accordance with an aspect of the present invention.
Figure 10:
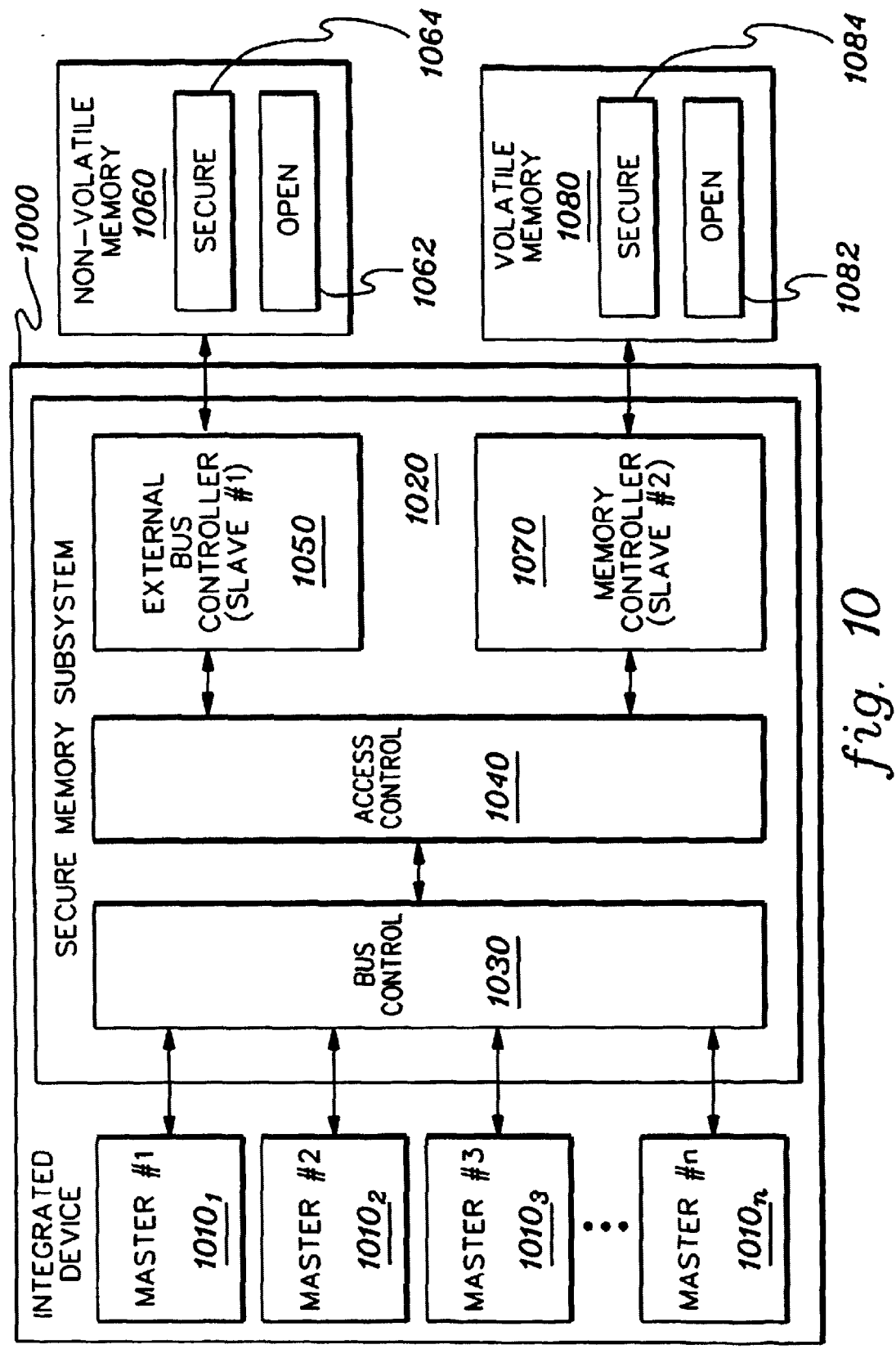
FIG. 10 depicts another embodiment of an access control function implemented within a secure memory subsystem of an integrated device, in accordance with an aspect of the present invention.

FIGS. 9 & 10 depict exemplary systems employing an access control function such as disclosed herein. Referring first to FIG. 9, an access control unit 940 is shown within a secure bridge 930 between internal bus control 920 and internal bus control 950 of an integrated device 900. As shown, multiple masters $910_1$, $910_2$, $910_3$, ... $910_n$ for a first bus 925 have requests combined by common bus control 920. The arbitrated requests are then passed to the slaves, one of which is a typical slave unit $915_n$, and the other is a slave interface of secure bridge 930 containing access control unit 940. The access control unit determines whether a request is allowable and if so, recreates the request as a master using its master interface on bus 2 955. In addition to the secure bridge, there is also shown a separate master on bus 2 $965_n$. The bus control unit 950 for bus 2 955 arbitrates between the two masters and selectively forwards granted requests to slaves $960_1$, $960_2$, $960_3$ ... $960_n$ as shown.

Note that in this implementation, masters $910_1$, $910_2$, $910_3$ ... $910_n$ can send requests to the slave $915_n$ on bus 1 925 without invoking the access control unit. The same is true of master $965_n$ and slaves $960_1$, $960_2$, $960_3$ ... $960_n$ on bus 2 955. However, any request between the two buses is governed by the access control unit 940 of the secure bridge 930.

FIG. 10 depicts an alternate example of an integrated device 1000 employing an access control function in accordance with the principles of the present invention. In this implementation, the access control function 1040 is inserted between a bus control unit 1030 and slave devices 1050 & 1070, all of which are shown within a secure memory subsystem 1020. As an alternate embodiment, bus control unit 1030 could reside outside of the secure memory subsystem unit. This figure is an extension of the embodiment of FIG. 4 in that slaves are explicitly shown as an external bus controller 1050 and a memory controller 1070. In this context, the combination of the bus control unit, access control unit and external controllers form a secure memory subsystem 1020. As a result, the external address space defined as non-volatile memory 1060 and volatile memory 1080 can be further divided into open area 1062 and secure area 1064, as well as open area 1082 and secure area 1084, respectively. In this use, "secure" implies that the masters $1010_1$, $1010_2$, $1010_3$ ... $1010_n$ can only access a space as defined in the access control unit 1040.

As a further variation, the encryption and decryption function discussed above could be included in a DMA controller such as commonly integrated in a set-top box design, as well as others. Doing so would remove the encryption and decryption logic from the access control cross-bar where latency might be added with each transfer. The DMA controller could be programmed by the host processor to move a block of data from one location to another. This includes memory-to-memory transfers. Assume that the integrated system has been defined so that memory is protected, with Master 1 accessing only read protected memory and Master 2 accessing write protected memory. Also, in this example, assume that there is clear data in protected memory that Master 2 needs to access but it must be encrypted (i.e., Master 2 can only see scrambled data). The DMA controller can be programmed to move the data from protected memory to open memory and then initiate a transfer of a given block, e.g., 64 bytes, which will be read in a burst, buffered internally, and then written in a burst. It is authorized to read protected memory according to the internal bus structure coding that is set up in the design, but in this case, it contains the encryption engine within the DMA controller. Based on the destination address parameters, the DMA controller automatically encrypts each block before writing it in a burst to open memory. In this manner, all encryption and decryption can be done on the data buffered in the DMA controller while transferring from one memory location to another, but because the read and write are separate bus operations, the bus is not stalled while the work is done. This approach still preserves the ability to limit clear data visibility to selected masters as described above.

Those skilled in the art will recognize from the above discussion that a control technique is presented herein which provides an ability to differentiate accesses by which functional masters are making memory requests, and then to either grant or limit access accordingly based on sets of secure control information. The control function presented distinguishes which functional master is requesting access and qualifies that access based on information contained in data access tables. The control function employs characteristics of a shared internal bus that connects functional masters to, for example, memory controllers or other slave devices, to allow each access to be further qualified, and in certain cases prevented.

The present invention can be included in an article of manufacture (e.g., one or more computer program products)

having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A data access method for an integrated system having multiple functional masters, the multiple functional masters having multiple master ids, the method comprising:

predefining at system initialization different levels of data access security to the multiple functional masters, wherein the different levels of data access security are predefined in an access table, the access table enforcing the defined access rights for the multiple functional masters to ensure security within the integrated system;

receiving a request for data from a requesting master of the multiple functional masters; and responsive to the request, determining by a data access control function whether to grant access to the data based on a master id of the requesting master, the data access level for the requesting master defined in the access table and an address of the data; and when granting access, deciding by the data access control function, with reference to the data access level of the requesting master, whether to decrypt the data when the request is a read request, and whether to encrypt the data when the request is a write request.

2. The method of claim 1, wherein the request comprises a granted master request received from bus control logic of the integrated system, and wherein said method is implemented in the data flow between the bus control logic and at least one slave of the integrated system.

3. The method of claim 1, further comprising determining access table parameters for use in decrypting or encrypting the data, the access table parameters including a key set pointer, a version number and a whitening address.

4. The method of claim 3, wherein the key set pointer points to a key set, the key set comprising a key value, encryption/decryption parameters, and a whitening variable, wherein the key value and the whitening variable are confidential numbers used for all data associated with the key set.

5. The method of claim 3, further comprising selectively performing an encryption process on the data when the request comprises a write request, the encryption process comprising performing whitening on clear write data, encrypting a result of the whitening, and further whitening an encrypted result, and selectively performing a decryption process on encrypted read data when the request comprises a read request, the decryption process including unwhitening the encrypted read data, decrypting a result of the unwhitening, and further unwhitening the decrypted result to achieve clear data for forwarding to the requesting master.

6. The method of claim 5, wherein the whitening and unwhitening comprise obtaining a whitening value, the obtaining of a whitening value comprising combining the whitening address, the version number, and the whitening variable of the access table parameters to obtain the whitening value.

7. The method of claim 6, wherein the combining comprises matching a size of the whitening value to a block size of the data.

8. The method of claim 1, further comprising implementing the method within a bus-to-bus bridge of the integrated system, wherein the requesting master is coupled to a first bus of the integrated system and communicates across the bus-to-bus bridge with at least one slave, the at least one slave being coupled to the bus-to-bus bridge across a second bus.

9. The method of claim 1, further comprising implementing the method within a memory subsystem of the integrated system, wherein the data resides in at least one of open volatile memory, secure volatile memory, open non-volatile memory, or secure non-volatile memory.

10. A data access system for an integrated system having multiple functional masters, the multiple functional masters having multiple master ids, the data access system comprising:

means for predefining at system initialization different levels of data access security to the multiple functional masters, wherein the different levels of data access security are predefined in an access table, the access table enforcing the define access rights for the multiple functional masters to ensure security within the integrated system;

means for receiving a request for data from a requesting master of the multiple functional masters; and means for determining by a data access control function whether to grant access to the data based on the master id of the requesting master, the data access level for the requesting master defined in the access table, and an address of the data, the means for determining being responsive to receipt of the request by the means for receiving; and when granting access, deciding by the data access control function, with reference to the data access level of the requesting master, whether to decrypt the data when the request is a read request, and whether to encrypt the data when the request is a write request.

11. The system of claim 10, wherein the request comprises a granted master request received from bus control logic of the integrated system, and wherein said system is implemented in the data flow between the bus control logic and at least one slave of the integrated system.

12. The system of claim 10, further comprising means for determining access table parameters for use in decrypting or encrypting the data, the access table parameters including a key set pointer, a version number and a whitening address.

13. The system of claim 12, wherein the key set pointer points to a key set, the key set comprising a key value, encryption/decryption parameters, and a whitening variable, wherein the key value and the whitening variable are confidential numbers used for all data associated with the key set.

14. The system of claim 12, further comprising means for selectively performing an encryption process on the data when the request comprises a write request, the encryption process comprising performing whitening on clear write data, encrypting a result of the whitening, and further whitening an encrypted result, and means for selectively performing a decryption process on encrypted read data when the request comprises a read request, the decryption process including unwhitening the encrypted read data, decrypting a result of the unwhitening, and further unwhitening the decrypted result to achieve clear data for forwarding to the requesting master.

15. The system of claim 14, further comprising means for obtaining a whitening value, the means for obtaining a whitening value comprising means for combining the whitening address, the version number, and the whitening variable of the access table parameters to obtain the whitening value.

16. The system of claim 15, wherein the means for combining comprises means for matching a size of the whitening value to a block size of the data.

17. The system of claim 10, wherein the system is implemented within a bus-to-bus bridge of the integrated system, with the requesting master being coupled to a first bus of the integrated system and communicating across the bus-to-bus bridge with at least one slave, the at least one slave being coupled to the bus-to-bus bridge across a second bus.

18. The system of claim 10, wherein the system is implemented within a memory subsystem of the integrated system, wherein the data resides in at least one of open volatile memory, secure volatile memory, open non-volatile memory, or secure non-volatile memory.

19. At least one program storage device readable by a machine, tangibly embodying at least one program of instructions executable by the machine to perform a data access method for an integrated system having multiple functional masters, the multiple functional masters having multiple master ids, the method comprising:

predefining at system initialization different levels of data access security to the multiple functional masters, wherein the different levels of data access security are predefined in an access table, the access table enforcing the defined access rights for the multiple functional masters to ensure security within the integrated system;

receiving a request for data from a requesting master of the multiple functional masters; and responsive to the request, determining by a data access control function whether to grant access to the data based on the master id of the requesting master, the data access level for the requesting master defined in the access table and an address of the data; and when granting access, deciding by the data access control function, with reference to the data access level of the requesting master, whether to decrypt the data when the request is a read request, and whether to encrypt the data when the request is a write request.

* * * * *